United States Patent [19]

Aichelmann et al.

[11] 4,371,503
[45] Feb. 1, 1983

[54] APPARATUS FOR THE VAPORIZATION OF ALUMINUM TRICHLORIDE

[76] Inventors: Dietmar Aichelmann, Hermann-Steinegger-Strasse 77; Karl Kannenberg, Friedrich-Ebert-Strasse 8; Dieter Schutte, Ernst-Reuter-Strasse 16, all of 7888 Rheinfelden; Axel Volling, Stettiner Strasse 2, 5040 Bruhl, all of Fed. Rep. of Germany

[21] Appl. No.: 310,415

[22] Filed: Oct. 9, 1981

Related U.S. Application Data

[63] Continuation of Ser. No. 167,156, Jul. 8, 1980, abandoned.

[30] Foreign Application Priority Data

Jun. 17, 1979 [DE] Fed. Rep. of Germany ....... 2928805

[51] Int. Cl.$^3$ ............................................. B01D 1/02
[52] U.S. Cl. .................................. 422/307; 422/229; 422/232; 422/309
[58] Field of Search ............... 422/163, 164, 225, 228, 422/229, 232, 233, 296, 286–288, 307, 309

[56] References Cited

U.S. PATENT DOCUMENTS

| 421,454 | 2/1890 | Vaile et al. ......................... 422/309 |
| 659,085 | 10/1900 | Miller ................................. 422/309 |
| 1,117,039 | 11/1914 | Halverson ....................... 422/307 X |
| 1,359,000 | 11/1920 | Stottmeister ................... 422/307 X |
| 2,554,082 | 5/1951 | Anderson .......................... 422/309 |
| 2,626,856 | 1/1953 | Alles .................................. 422/229 |
| 2,939,770 | 6/1960 | Schwartzkopff et al. .......... 422/229 |
| 3,147,068 | 9/1964 | Castle et al. ................... 422/296 X |
| 3,684,458 | 8/1972 | McCammon et al. .......... 422/225 X |
| 4,260,585 | 4/1981 | Noda et al. .................... 422/307 X |

FOREIGN PATENT DOCUMENTS 2504743 8/1976 Fed. Rep. of Germany ...... 422/309

Primary Examiner—Richard L. Chiesa
Attorney, Agent, or Firm—Cushman, Darby & Cushman

[57] ABSTRACT

There is provided an apparatus for the vaporization of aluminum trichloride which consists of a U-shaped trough having flat front surfaces in which
(a) there is rotatably disposed at the midpoint of the curve of the front surfaces a shaft aligned parallel to the horizontal longitudinal axis of the trough on which shaft there is disposed a helical stirrer having equal but oppositely directed pitches, in which
(b) there are disposed on the curve parallel to the horizontal longitudinal axis of the trough outside or in the wall at least two heating rods along the entire length of the trough and in which
(c) there is disposed at one end at the lowest point of the curve a device for the discharge of the melted material. The aluminum trichloride vaporized by means of the apparatus of the invention can be used for the pyrogenic production of aluminum oxide.

3 Claims, 3 Drawing Figures

APPARATUS FOR THE VAPORIZATION OF ALUMINUM TRICHLORIDE

This is a continuation, of application Ser. No. 167,156 filed July 8, 1980, now abandoned.

BACKGROUND OF THE INVENTION

The invention is directed to an apparatus for vaporization of aluminum trichloride.

Aluminum trichloride is used in the vapor state as starting material for the pyrogenic production of aluminum oxide.

The vaporization and the simultaneous distribution of the aluminum trichloride in a carrier gas, as for example, in hydrogen, is extraordinarily difficult and problematical since aluminum trichloride sublimes directly from the solid into the vapor phase without passing through the liquid phase.

To better control the vaporization process, at present aluminum trichloride is mixed with alkali chloride, e.g. sodium chloride or potassium chloride. From this mixture there forms a liquid ternary melt out of which the aluminum trichloride vaporizes.

It is known to vaporize aluminum trichloride by a process in which a mixture of aluminum trichloride and alkali chloride is heated by leading an electrical current therethrough (Austrian Pat. No. 261,236 and German OS No. 1,458,301.

SUMMARY OF THE INVENTION

According to the invention there is provided an apparatus for the vaporization of aluminum trichloride which consists of a U-shaped trough having flat front surfaces in which (a) there is rotatably disposed at the midpoint of the curve of the front surfaces a shaft aligned parallel to the horizontal longitudinal axis of the trough on which shaft there is disposed a helical stirrer having equal but oppositely directed pitches, in which (b) there are disposed on the curve parallel to the horizontal longitudinal axis of the trough outside or in the wall at least two heating rods along the entire length of the trough and in which (c) there is disposed at one end at the lowest point of the curve a device for the discharge of the melted material.

The advantages of the apparatus of the invention can be seen above all in the following points.

Because of the arrangement of the heating rods parallel to the horizontal longitudinal axis of the U-shaped trough it is possible to raise the heating rod temperature up to 1,400° C.

The arrangement of the helical stirrer of the invention makes possible a good thorough mixing of the melted material and prevents the formation of undesired deposits on the inner wall of the U-shaped trough.

The apparatus of the invention can be adjusted at will in its dimensions depending on the capacity requirements.

The apparatus of the invention will be further explained and described in connection with the drawings.

BRIEF DESCRIPTION OF THE DRAWINGS

FIG. 3 is a schematic representation of the apparatus of the invention in cross-section.

The apparatus can comprise, consist essentially of or consist of the stated elements.

DESCRIPTION OF THE PREFERRED EMBODIMENTS

Figure 1:
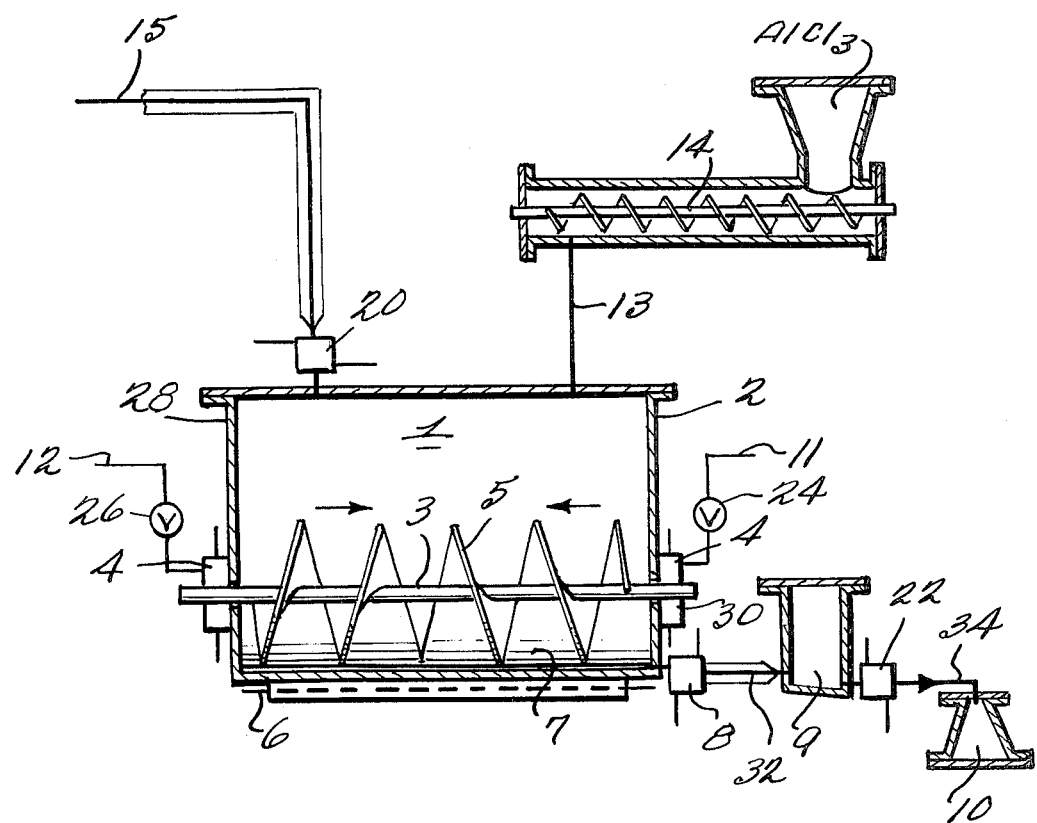
FIG. 1 is a schematic representation of the apparatus of the invention in longitudinal section.

As shown in FIG. 1 there is rotatably disposed in the U-shaped trough 1 at the midpoint of the curve of the front surfaces 2 and 28 a shaft 3 in the bearings 4 and 30. There is disposed on this shaft 3 a helical stirrer 5 having equal but oppositely directed pitches.

There are disposed on the curve 7 of the U-shaped trough 1 parallel to the horizontal longitudinal axis of the trough heating rods 6, 36, 46, 56, 66 and 76 along the entire length of the trough.

At the lowest point of the curve 7 there is disposed a device 8 for the discharge of the melted material. Connected to the discharge device 8 via insulated line 32 are expansion tank 9, valve 22, line 34 and collecting vessel 10.

The bearings 4 and 30 of the shaft 3 are maintained in nitrogen via the feed pipes 11 and 12 and valves 24 and 26 in order to avoid an escape of the melted material through the bearings 4 and 30.

The solid aluminum trichloride alkali chloride (e.g. NaCl or KCl) mixture is supplied by means of screw conveyor 14 via feed pipe 13 into the U-shaped trough 1.

The vapor form aluminum trichloride is suppled via valve 20 and insulated line 15 to the apparatus (not shown) for the pyrogenic production of aluminum oxide.

Figure 2:
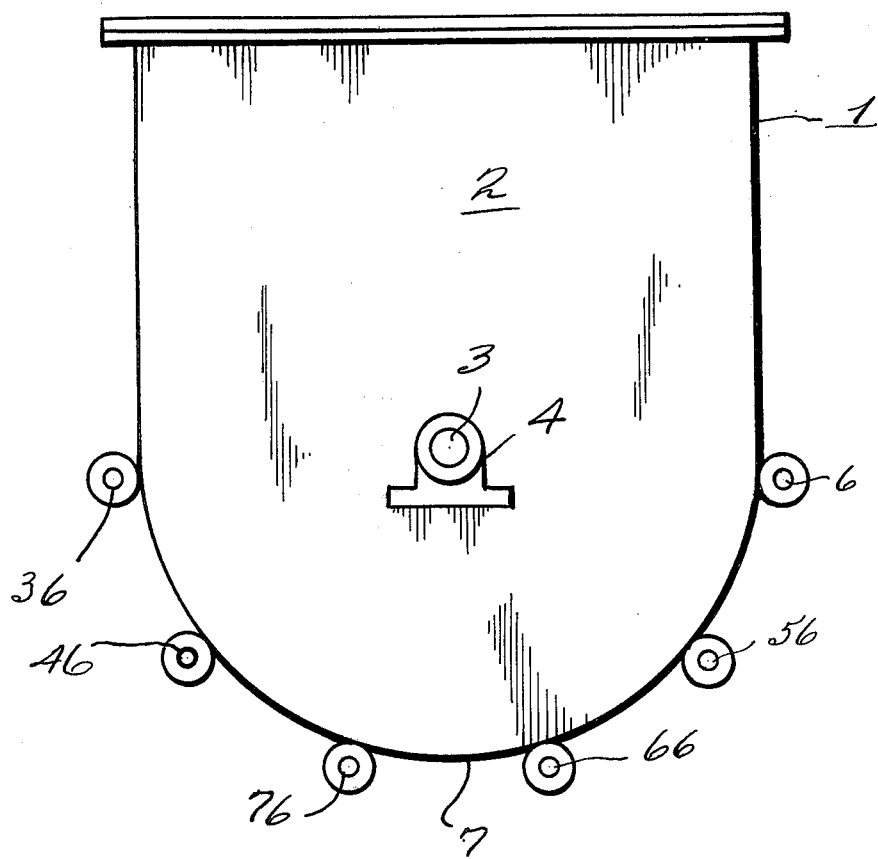
FIG. 2 is a schematic representation of the apparatus of the invention in cross-section.

As shown in FIG. 2 there are disposed six heating rods 6, 36, 46, 56, 66 and 76 on the curve of the U-shaped trough 1 parallel to the horizontal longitudinal axis of the trough.

There is disposed at the midpoint of the curve of the front surfaces 2 and 28 of the U-shaped trough the bearing 4 for the shaft 3. FIG. 3 shows the heating rods 6 disposed in the wall of the heating-trough 1.

What is claimed is:

1. An apparatus for the vaporization of aluminum trichloride comprising an enclosed curved trough in the shape of an U, having a pair of flat front curved surfaces, means for introducing a meltable mixture containing aluminum chloride into the trough and means for removing vaporized aluminum chloride from the upper portion of the trough, rotatably disposed at the midpoint of the curve of said front surfaces a shaft aligned parallel to the horizontal longitudinal axis of the trough, said shaft including nitrogen gas sealing means for said shaft to prevent escape of aluminum chloride, disposed on said shaft a helical stirrer having two equal but oppositely directed pitches, disposed on the curve of the trough parallel to the horizontal longitudinal axis of the trough outside of the wall thereof at least two heating rods along the entire length of the trough, and disposed at one end of the trough at the lowest point of said curve a means for the continuous discharge of melted material.

2. An apparatus for the vaporization of aluminum trichloride comprising an enclosed curved trough in the shape of an U, having a pair of flat front curved surfaces, means for introducing a meltable mixture containing aluminum chloride into the trough and means for removing vaporized aluminum chloride from the upper portion of the trough, rotatably disposed at the midpoint of the curve of said front surfaces a shaft aligned parallel to the horizontal longitudinal axis of the trough, said shaft including nitrogen gas sealing means for said shaft to prevent escape of aluminum chloride, disposed on said shaft a helical stirrer having two equal but oppositely directed pitches, disposed on the curve of the trough parallel to the horizontal longitudinal axis of the trough in the wall thereof at least two heating rods along the entire length of the trough, and disposed at one end of the trough at the lowest point of said curve a means for the continuous discharge of melted material.

3. An apparatus according to claim 1 or 2 wherein the means for introducing the meltable mixture containing aluminum chloride is screw conveying means.

* * * * *